(12) United States Patent
Lo

(10) Patent No.: US 6,289,731 B1
(45) Date of Patent: Sep. 18, 2001

(54) LIQUID LEVEL DETECTOR

(76) Inventor: Jui-Yang Lo, No. 2, Alley 27, Lane 143, Yuan Shan Road, Chung Ho City, Taipei Hsien (TW)

( * ) Notice: Subject to any disclaimer, the term of this patent is extended or adjusted under 35 U.S.C. 154(b) by 0 days.

(21) Appl. No.: 09/235,598

(22) Filed: Jan. 20, 1999

(51) Int. Cl.[7] .............................. G01F 23/36; G01F 23/30; G01F 23/56
(52) U.S. Cl. ................................ 73/313; 73/305; 73/314; 73/DIG. 5; 73/319
(58) Field of Search .................................. 73/319, 290 B, 73/305, 306, 312, 313, 314, DIG. 5

(56) References Cited

U.S. PATENT DOCUMENTS

| | | | |
|---|---|---|---|
| 3,024,659 | * | 3/1962 | White ...................................... 73/319 |
| 4,845,986 | * | 7/1989 | Hayashi et al. .................... 73/290 R |
| 5,718,146 | * | 2/1998 | Liang ..................................... 73/319 |
| 5,848,549 | * | 12/1998 | Nyce et al. ............................. 73/319 |
| 5,862,702 | * | 1/1999 | Liang ..................................... 73/313 |

* cited by examiner

Primary Examiner—Hezron Williams
Assistant Examiner—Dennis Loo
(74) Attorney, Agent, or Firm—Pro-Techtor International Services

(57) ABSTRACT

A liquid level detector that includes an internal tube, a coil wound on an external surface of the internal tube, an external tube, a float ball, a base, and an upper fixing socket. The float ball is disposed in the internal tube, which is wound by a coil on its external surface. The internal tube is enclosed by the external tube, wherein an upper end of the internal tube is connected to the upper fixing socket, while the bottom end is coupled with the base. The two ends of the external tube are sealed for protection of the coil wound on the external wall of the internal tube. When the liquid level detector is employed to detect a liquid level, the float ball in the internal tube will move up or down according to the liquid level, and the induced change in inductance will be converted into a usable signal by a conversion circuit to drive a display apparatus to show the liquid quantity.

5 Claims, 4 Drawing Sheets

LIQUID LEVEL DETECTOR

BACKGROUND OF THE INVENTION

1. Field of the invention

This invention relates to a liquid level detector, particularly to a liquid level detector that performs non-contact and non-friction measurement with advantages in excellent durability, simple structure, high resolution, low cost, and easy fabrication.

2. Description of the prior art

As shown in FIG. 1, a prior liquid level detector mainly comprises a main body 10, a float ball 12, a connecting rod 14, a sensing head 16, a Ni—Cr coil 18, a pivot 20, and a signal wire 22. A circular casing is provided at lower end of the main body 10 for accommodating the Ni—Cr coil 18, which is formed by winding Ni—Cr wire on a Bakelite plate, and the pivot 20 is positioned at the center portion of the circular casing, wherein the connecting rod 14 is passing through the pivot 20 and attached thereto; and one end of the connecting rod 14 is extended and pivot-jointed with the float ball 12, while the other end of the connecting rod is coupled with the sensing head 16, which is propped by a spring to keep in touch with the arc shaped Ni—Cr coil 18. When the prior liquid level detector is applied to somewhere, say an oil tank, the float ball 12 is floating in the oil and the sensing head 16 is touching the Ni—Cr coil 18. Position of the floating ball 12 ascends or descends according to the liquid level to drive the sensing head 16 fixed at the connecting rod 14 to slide and contact on the Ni—Cr coil. Any change in impedance owing to displacement of the sensing head 16 will be transmitted via a signal wire 22 for being read on a display apparatus that will display data of liquid quantity. The defects of the abovesaid prior liquid level detector shall include: a complicated structure for applying the float ball 12, the connecting rod 14, the sensing head 16, the Ni—Cr coil 18, etc; high cost; shortened durability due to possible fracture of the Ni—Cr coil 18 that is whetted in the long term by touching of the sensing head 16; non-uniformity of the arc shaped Bakelite plate that may cause a clearance problem between the sensing head 16 and the Ni—Cr coil 18—the detector may fail to detect if clearance is too big, or, the coil may be fractured owing to friction if the clearance is too small; when the detector being applied under a quaking condition, such as in a mobile car, wherein the detector may be impaired or malfunctioned due to out of order of internal components.

In view of the above imperfections, the inventor is benefited with years of manufacturing experience in related field to have an improved construction of this invention developed and proposed.

SUMMARY OF THE INVENTION

This invention is proposed to provide a liquid level detector, wherein a float ball is moving up or down in an internal tube without substantial contact with an external coil. The non-contact induction can avoid any fracture of the coil for prolonging the durability and refrain from quakes for keeping at an integral, usable and precise condition.

Another object of this invention is to provide a liquid level detector, which avails itself of the movable float ball in the internal tube for mutual induction with the external coil for obtaining a high resolution and more precise result by reading inductance values at different positions.

Another more object of this invention is to provide a liquid level detector without complicated components, so that the structure can be simplified for easy fabrication and low cost purposes.

A further object of this invention is to provide a liquid level detector, wherein the induced signal of the float ball and the coil can be converted internally into a voltage value to drive a display apparatus directly, or can be converted by an external conversion circuit.

A further more object of this invention is to provide a liquid level detector, wherein the length of the internal tube and coil can be changed to meet some special requirement or usage in order to enlarge its application scope.

A liquid level detector of this invention backed with the above described advantages comprises: an internal tube, a coil wound on the internal tube, an external tube, a float ball, a base, and an upper fixing socket, etc, wherein a magnetic material coated float ball is disposed in the coil wound internal tube, which is enclosed by an external tube. A plurality of air apertures and a thread portion are formed at upper end of the internal tube, where the thread portion is commensurate with a tapped hole in the upper fixing socket. The bottom end of the internal tube is coupled with the base, which is provided with a plurality of infiltration holes, while those two ends of the external tube are glue-sealed to form an isolated space for protection of the coil outside the internal tube. A circular wall is provided at top end of the upper fixing socket for reception of a printed circuit board. When detecting, the float ball is moving up or down according to liquid level, and the mutual inductance change in the coil will be converted by the printed circuit board in the upper fixing socket into voltage value to be displayed on the external display apparatus.

BRIEF DESCRIPTION OF THE DRAWINGS

For a better understanding to the present invention, together with further advantages or features thereof, at least one preferred embodiment will be elucidated below with reference to the annexed drawings in which.

DETAILED DESCRIPTION OF THE PREFERRED EMBODIMENT

Figure 1:
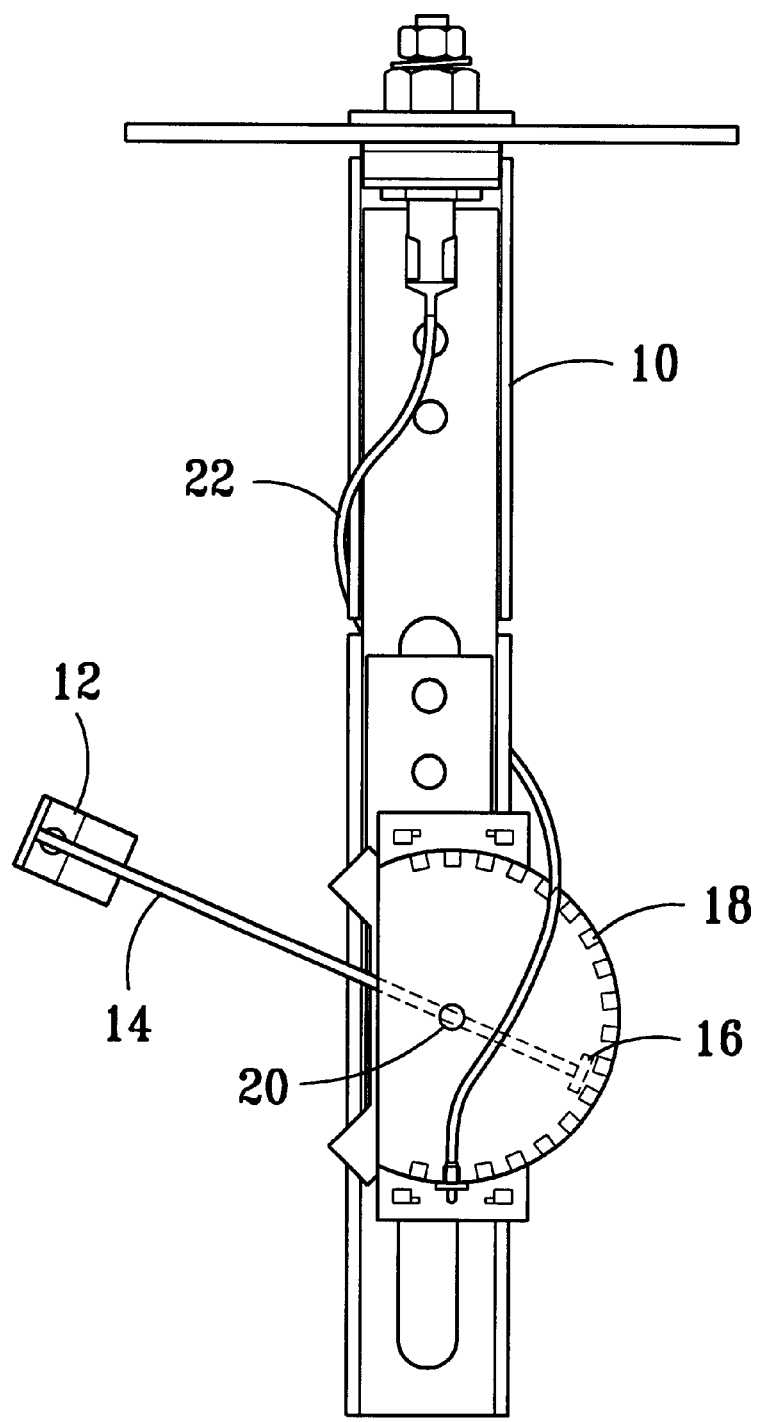
FIG. 1 is a lateral view of a prior liquid level detector.
Figure 2:
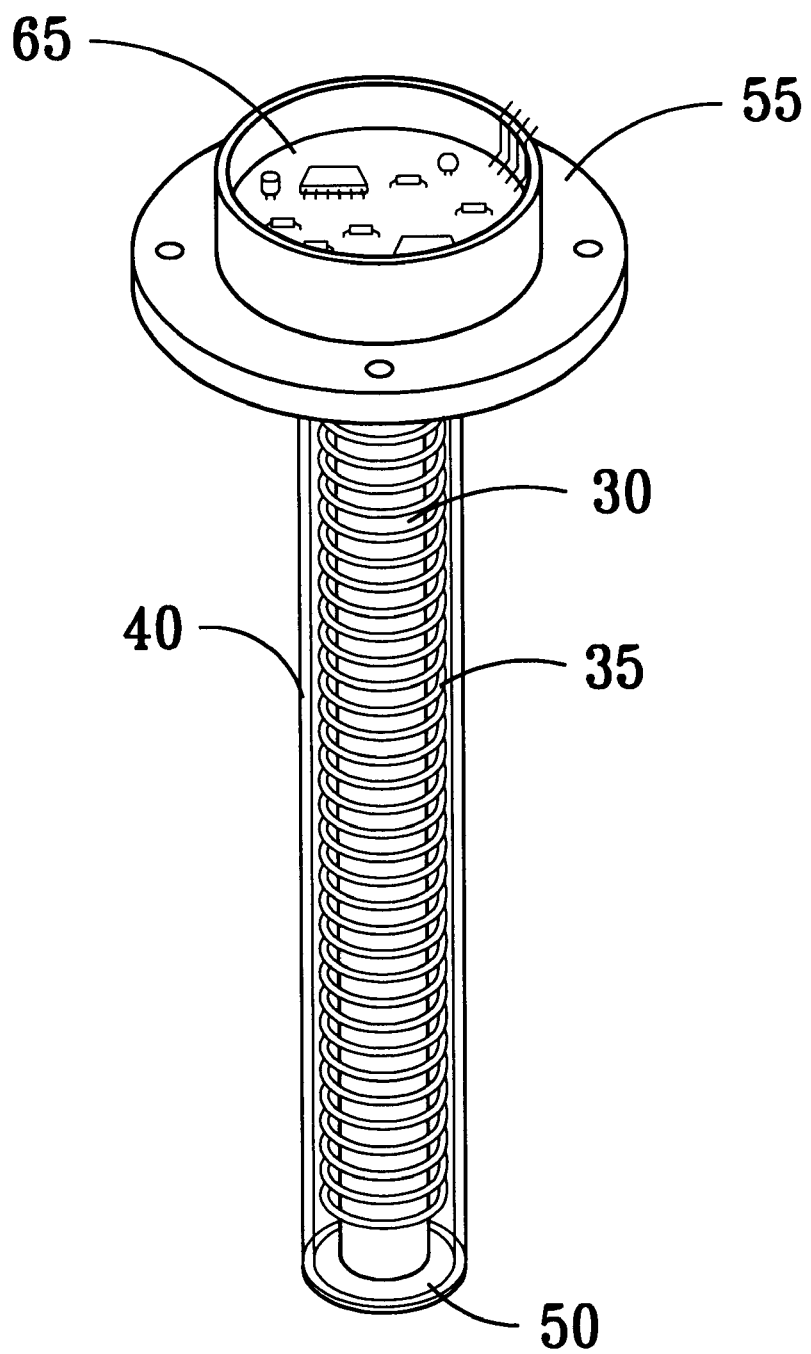
FIG. 2 is a three-dimensional schematic view illustrating a liquid level detector of this invention.
Figure 3:
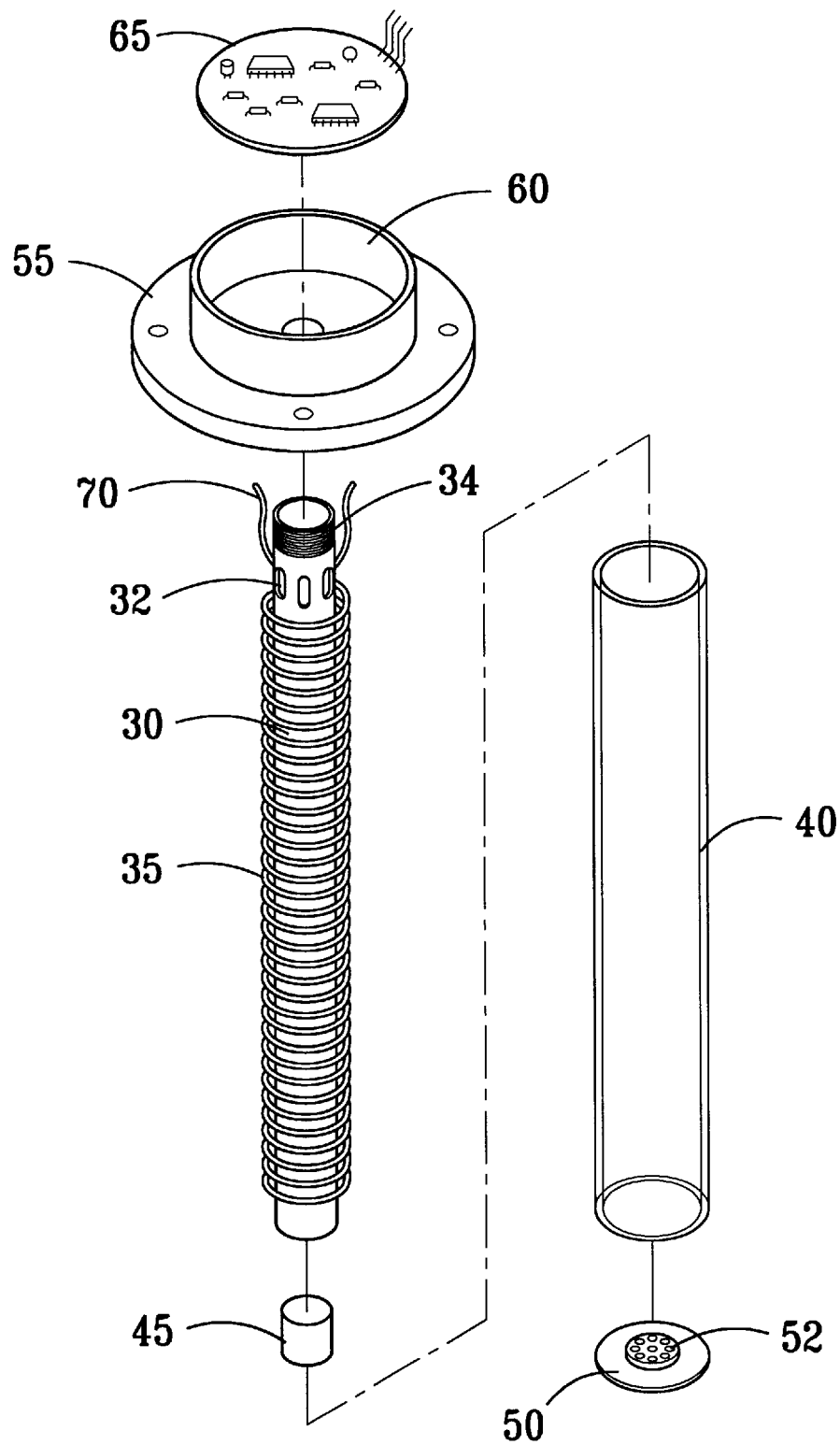
FIG. 3 is an exploded schematic view of the liquid level detector.

As shown in FIGS. 2 and 3, a liquid level detector of this invention mainly comprises: an internal tube 30, a coil 35 wound on the internal tube 30, an external tube 40, a float ball 45, a base 50, and a fixing socket 55 on the top end, etc. The float ball 45 coated with magnetic material is disposed in the internal tube 30, which is surrounded by the external tube 40. A plurality of air apertures 32 and a thread portion 34 are formed at upper end of the internal tube 30, wherein the thread portion is commensurate with a tapped hole 57 in the fixing socket 55. The bottom end of the internal tube 30 is coupled to the base 50, wherein a plurality of infiltration holes 52 is provided. Those two ends of the external tube 40 are glue-sealed for protection of the coil 35. A circular wall 60 on top of the upper fixing socket 55 is formed for reception of a printed circuit board 65, and one end of a signal wire 70 is coupled to the coil 35, the other end passes through the upper fixing socket 55 to couple to the printed circuit board 65 by soldering.

Figure 4:
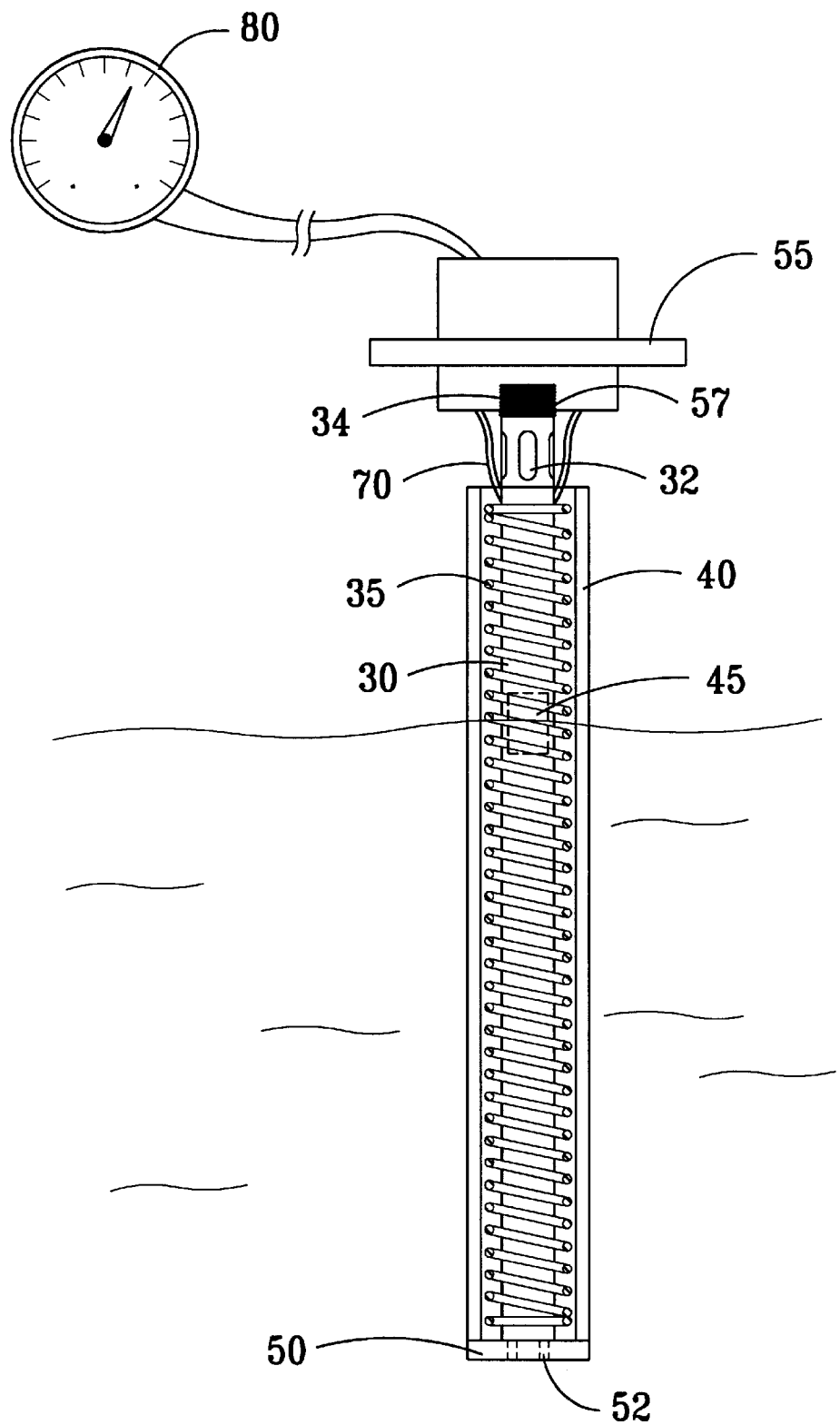
FIG. 4 is an embodiment schematic view of the liquid level detector.

FIG. 4 showing an embodiment of the above depicted liquid level detector, wherein the liquid can enter the internal holes 30 via the infiltration holes 52 in the base 50; the float ball 45 in the internal tube 30 will change its position according to liquid level, and consequently change the inductance value that is to be transmitted to the printed circuit board 65 via the signal wire 70; and the signal received will be converted into voltage shown on the display apparatus 80 representing the liquid quantity.

The provided liquid level detector of this invention is more advantageous than the prior analogues in:

1. As the float ball moving up or down in the internal tube according to liquid level in a non-contact induction manner, wherein there is no substantial contact between the float ball or a sensing head and the coil, therefore the detector may not be affected by quakes or friction, so that its life time can be prolonged, 2. In virtue of mutual induction of the float ball in the internal tube and the external coil, wherefrom the induction data can provide a high resolution and precise result;

3. Owing to simple mechanical components employed, whereby the liquid level detector of this invention can be made easily at relatively low cost;

4. An induction value obtained from mutual induction between the float ball and the coil that can be converted into voltage by the printed circuit board in the upper fixing socket to drive a display apparatus directly, or can be converted by an external conversion circuit;

5. As to meet some other requirement or usage, the internal tube and the coil being replaceable by changing the length of the internal tube and the coil.

In the above described, at least one preferred embodiment has been elucidated with reference to relating drawings annexed, it is apparent that numerous variations or modifications may be made without departing from the true spirit and scope thereof, as set forth in the following claims.

What is claimed is:

1. A liquid level detector comprising:

an internal tube, an electrically conductive coil wound on external surface of said internal tube, an external tube enclosing said internal tube, a float ball coated with magnetic material, a base, an upper fixing socket, and a circuit in electrical communication with said coil; wherein said float ball coated with magnetic material is disposed in said internal tube, a plurality of air apertures and a thread portion are formed at an upper end of said internal tube, said thread portion at said upper end of said internal tube is received in a tapped hole in said upper fixing socket, a bottom end of said internal tube is coupled to said base, and said base comprises at least one infiltration hole; such that liquid entering said liquid level detector through said at least one infiltration hole causes said float ball to rise past said coil, thereby generating an inductance, said circuit converting said inductance to a voltage indicative of a liquid level in said liquid level detector.

2. The liquid level detector of claim 1, wherein said internal tube is a hollow cylindrical body.

3. The liquid level detector of claim 1, wherein said external tube is a hollow cylindrical body with a diameter larger than that of said internal tube.

4. The liquid level detector of claim 1, wherein a through hole is included in said upper fixing socket, at least one signal wire passing through said through hole.

5. The liquid level detector of claim 1, wherein said circuit is located outside said external tube of said liquid level detector.

* * * * *